United States Patent [19]
Kordesch

[11] 3,944,435
[45] Mar. 16, 1976

[54] BONDED COMPONENT ASSEMBLY FOR FLAT CELLS AND METHOD THEREFOR

[75] Inventor: Karl V. Kordesch, Lakewood, Ohio

[73] Assignee: Union Carbide Corporation, New York, N.Y.

[22] Filed: Dec. 24, 1974

[21] Appl. No.: 536,184

[52] U.S. Cl. .......................... 136/111; 136/120 FC
[51] Int. Cl.² .......................................... H01M 6/06
[58] Field of Search ................... 136/111, 120, 10

[56] References Cited
UNITED STATES PATENTS

| | | | |
|---|---|---|---|
| 2,666,802 | 1/1954 | Woodring et al. | 136/111 |
| 3,443,994 | 5/1969 | Tamminen | 136/10 X |
| 3,563,805 | 2/1971 | Deierhoi, Jr. | 136/111 |
| 3,617,387 | 11/1971 | Grulbe et al. | 136/111 |
| 3,819,412 | 6/1974 | Taylor et al. | 136/10 |
| 3,871,921 | 3/1975 | Beatly | 136/111 |

Primary Examiner—John H. Mack
Assistant Examiner—C. F. Lefevour
Attorney, Agent, or Firm—Cornelius F. O'Brien

[57] ABSTRACT

A bonded component assembly and method for producing it, comprising an anode, a cathode and a plasticizable screen disposed between and adhesively securing said anode to said cathode in a fixed spaced-apart relationship with a separator, if needed, between and in contact with said anode and said cathode through the openings in the plasticizable screen.

18 Claims, 4 Drawing Figures

BONDED COMPONENT ASSEMBLY FOR FLAT CELLS AND METHOD THEREFOR

The invention described herein was made in the course of, or under Contract No. DAAB07-70-C-0061 with the United States Army Electronic Command, Fort Monmouth, New Jersey.

FIELD OF THE INVENTION

The invention relates to thin flat cells employing a bonded component assembly and a method for producing such a component assembly. Specifically, the component assembly comprises an anode such as a metal anode, and a cathode, such as an active oxidic material, secured in a spaced-apart relationship by at least one plastic non-conductive network disposed between and adhesively secured at one of its faces to the anode and at its opposite face to the cathode.

DESCRIPTION OF THE PRIOR ART

The continuing development of portable electrically powered devices of compact design such as tape recorders and playback machines, radio transmitters and receivers, shavers, watches, and motion picture or still cameras creates a continuing demand for the development of reliable, compact batteries for their operation. The power needs of such devices are varied. Thus, a watch requires a battery which will perform uniformly for at least a year at low drain while recorders and radios require batteries which will operate intermittently for perhaps a half hour to several hours at substantially higher drains followed by longer periods of nonuse. A motion picture camera in which a battery may operate exposure control means as well as drive a motor usually requires the battery to operate in a repetitive series of relatively short periods of time in a given day, but may not be used for weeks or months. A still camera in which a battery may be used to fire a flash bulb and in some cases to control exposure means and advance the film after each exposure requires the battery to deliver a series of pulses of rather high current, frequently in rapid succession.

While the battery industry has been quite successful in providing batteries to satisfy these diverse demands, the vast majority of the batteries produced for and used in devices of the type discussed, are cylindrical. They may range in height from the familar "button" cells to as much as one-half inch to one inch or even more and in diameter from roughly about one-half inch to one inch or more. Although they are excellent sources of electricity, their shape has limited to some extent the size and shape of the devices for which they are intended. As design concepts change there is increasing emphasis placed on thin, flat shapes. These flat shape devices cannot be made to accommodate the familiar cylindrical battery without devoting more space to the battery than is desired. Accordingly, there is an increasing demand for thin, flat batteries.

The problem associated with maintaining good electrical contact between cell elements is particularly notable in thin flat cell constructions where external supports are generally impractical since such members may be many times the thickness of the cell itself. In addition, since some flat cells possess a large unsupported surface, the ususal means employed for maintaining cell integrity along the periphery of the cell may not be sufficient to maintain good electrical contact between cell elements at the center of the flat cell. For example, the formation of gases within the cell generally has a tendency to separate the cell components thereby increasing the resistance of the cell to a degree that the cell could become inoperative for its intended use.

It has previously been suggested in the prior flat cell art that adhesives be used in assembling specific cell components together, for example, a cathode to a cathode collector; a cathode collector to an outer envelope member; and a cell to another cell. These bonding techniques are set forth in detail in U.S. Pat. Nos. 2,870,235 to Soltis, 3,379,574 to Grulke et al, 2,762,858 to Wood, 3,223,555 to Solomon et al, 2,658,098 to Coleman et al and 2,487,985 to Ruben. The adhesives described in these patents have been suitable for use only in a limited portion of the cell and could not be used to maintain the entire cell structure as an integral unit. For example, none of the adhesives previously suggested has been entirely suitable for use in providing permanent adhesion to the corroding face of the cell anode. In this connection, it is well known that during discharge of the cell, the anode metal is consumed, and if consumed in a non-uniform manner, physical voids could occur in the anode surface. Proper wetting of the anode surface by the adhesive must be maintained for the adhesive to be effective.

U.S. Pat. No. 3,617,387 to Grulke et al discloses a flat cell which is completely internally bonded in such a way that no external compression is required to maintain good electrical contact between the cell components, said cell employing a polymeric adhesive layer between the components.

U.S. Pat. No. 3,563,805 to Deierhoi, Jr. discloses a flat cell having an anode, a cathode, a separator, an immobilized adhesive electrolyte and a cathode collector, all of which are appropriately arranged and adhesively secured together by a conventional sealing means which effectively maintains a relatively low electrical resistance contact between all the individual cell components.

Another approach to produce a flat multicell battery is disclosed in U.S. Pat. Nos. 3,770,504 to Bergum et al and 3,770,505 to Bergum, wherein the confronting faces of each adjacent pair of conductive layers forming the battery are adhered and electrically bonded one to the other. In addition, adjacent cells of the battery are electrically connected one to the other by means of an electrolyte impervious intercell connector layer which extends beyond the electrodes of the cells so that the peripheral faces of the intercell connector layers can be suitably sealed to provide a liquid impervious seal around each cell.

Pending U.S. patent application Ser. No. 489,731 filed July 18, 1974 by T. Kalnoki-Kis discloses another approach to producing a thin, flat cell or battery wherein the cathode collector of the cell is perforated for the purpose of venting undesirable gases formed during storage and discharge of the cell or battery. In a similar approach, pending U.S. patent application Ser. No. 489,843 filed July 18, 1974 by T. Kalnoki-Kis et al discloses a thin flat cell which employs a perforated anode coated with a gas-permeable electrolyte-impermeable polymeric coating which allows the venting of undesirable gases formed within the cell while preventing any electrolyte loss from the cell.

Although all of the above approaches work to some degree in producing a flat cell, swelling and/or a buildup of undesirable gas pressure may occur within a cell during shelf storage or during discharging which could be sufficient to separate two or more of the cell's components thereby greatly increasing the internal resistance of the cell to a point where the cell becomes ineffective for its intended use.

In fuel cells where gases and/or liquids are employed as active materials of the cells, what is needed in the art is a compact, non-external securing means for maintaining the anode collector and the cathode collector in a fixed spaced-apart relationship while also providing means for accommodating and securing therebetween, if necessary, a separator or the like.

It is an object of the present invention to provide a thin, flat cell employing a component assembly of an anode and a cathode secured in a spaced-apart parallel relationship by at least one plastic non-conductive network disposed between and adhesively secured at one of its faces to the anode and at the opposite face to the cathode.

It is another object of the present invention to provide a thin, flat cell employing among other components, a metal anode secured in a spaced-apart parallel relationship to a cathode of oxidic material by at least one plastic non-conductive network disposed between and adhesively secured at one of its faces to the anode and at the opposite face to the cathode.

Another object is to provide a thin, flat liquid cathode cell system employing among other components, a metal anode secured in a spaced-apart parallel relationship to a cathode collector by at least one plastic non-conductive network disposed between and adhesively secured at one of its faces to the anode and at the opposite face to the cathode collector.

Another object is to provide a thin, flat fuel cell employing among other components, an anode collector secured in a spaced-apart parallel relationship to a cathode collector by at least one plastic non-conductive network disposed between and adhesively secured at one of its faces to the anode collector and at the opposite face to the cathode collector.

The invention also relates to a method for producing one or more of the above-identified component assemblies.

SUMMARY OF THE INVENTION

The invention broadly relates to a flat cell construction useful with various electrochemical systems, which construction uses a plastic non-conductive network for securing, in a spaced-apart relationship, two components of a cell such as the anode to the active cathode material, the anode to the cathode collector, the anode collector to the cathode collector or some other two component assembly.

As used herein, a plastic non-conductive network shall mean a discontinuous plastic flat sheet having a plurality of openings, preferably uniformly disposed in said sheet, such as a plastic grid, a plastic screen or a plastic mesh; a plurality of thin plastic strips which when disposed on a flat surface will define a plurality of openings or spaces between the adjacent strips; discrete shapes, such as squares, circles, etc., which when disposed on a flat surface will define a plurality of openings or spaces between the adjacent discrete shapes; or the like. The material of the non-conductive plastic network shall mean a plastic material that can be made to have adhesive characteristics such that it will wet and strongly cling or adhere to a surface when under the influence of pressure, heat and/or when contacted and wet with a suitable solvent. The non-conductive plastic network could also be composed of a plastic network having an adhesive layer thereon, said adhesive layer being the means for securing the plastic network to the spaced-apart components of the cell.

The non-conductive plastic material has to be cohesive so that it will strongly cling to itself thereby maintaining its integral structure and must also be stable with respect to the other components of the cell in which it is used. Suitable non-conductive plastic materials for use in this invention include such materials as polyethylene, polysulfone, acrylic, polymethacrylic resin, nylon, polyvinyl chloride, polypropylene, polystyrene, polytetrafluoroethylene, or the like. Nylon, polyethylene and polyvinyl chloride are thermoplastic and are relatively hard materials to dissolve and, therefore, should be heated to make them adhesive.

Suitable solvents for use in this invention include such materials as ketones, aromatic and aliphatic hydrocarbons, esters and chlorinated hydrocarbons.

Preferable plastic and solvent combinations are as follows:

1. polysulfone with dichloromethane, trichloroethylene or chloroform;
2. polymethacrylate with ketones or esters;
3. polystyrene with ketones or aromatic hydrocarbons;
4. polyvinyl chloride with ketones, esters or aromatic hydrocarbons.

The non-conductive plastic network should have sufficient openings so that when assembled in a cell, an electrolyte, an electrolyte-impregnated separator, or some other active or inactive material disposed in the openings will be able to sufficiently contact the faces of the two components secured by the plastic network in a spaced-apart relationship. The basic requirement is that sufficient plastic material be disposed between the spaced-apart components so as to secure them in a substantially fixed relationship during the storage period and the operational mode period of the cell. It is during these periods that gases or other disturbances are generally produced which have a tendency to separate such components. For most component assemblies, a plastic network should have a projected area on the face of either of the components it is secured to of at least 2% of the face area of the component to insure good adhesive contact therebetween. Preferably a projected area of between about 5% and 15% would be suitable for most flat cell constructions, with a projected area of between about 5% and 10% being most preferred. A projected area of less than 2% would not supply sufficient securing means for the spaced-apart components while a projected area of greater than 15% would, in some applications, reduce the face area of the components which would otherwise be available for efficient cell performance.

As used herein, and as disclosed in an article titled "Electrochemical Reactions in Batteries" by Akiya Kozawa and R. A. Powers in the Journal of Chemical Education — Vol. 49, pages 587 to 591, September 1972 edition, a cathode material is the cathode reactant and, therefore, is the material electrochemically reduced at the cathode. Anodic materials (anodes) are usually easily oxidized metals which are characterized by the ease with which they part with electrons, thereby dissolving to form positively charged ions in the electrolyte of the cell. The cathode collector and the anode collector are not active reducible or oxidizable materials and function as current collectors (electronic conductors) to the cathode and anode terminals, respectively, of a cell.

The component assembly for use in Leclanche type electrochemical systems acccording to this invention comprises a metal anode, a molded cathode of oxidic material and at least one plastic non-conductive flat network disposed between and adhesively secured at one of its faces to said anode and at its opposite face to said cathode material thereby maintaining said anode and said cathode material in a secured spaced-apart relationship. In a fully assembled flat cell, an electrolyte or an electrolyte-impregnated separator would be disposed between and in contact with said metal anode and said cathode material through the openings in the plastic network, and a cathode collector would normally be physically and electrically contacted with the cathode material for providing connection to an external contact terminal for the cell.

In Leclanche electrochemical systems, manganese dioxide is the positive active material, zinc is the negative active material, preferably porous or expanded zinc, and the electrolyte would usually comprise aqueous ammonium chloride and/or zinc chloride. The cathode collector could be any conducting material such as stainless steel, titanium, gold-plated nickel and nickel alloys, carbon and graphite materials such as Grafoil* and the like, preferably carbon or graphite because of their relatively low cost and good physical properties, such as strength.

*Grafoil is a trademark for flexible graphite material of expanded graphite particles compressed together. Grafoil is manufactured by Union Carbide Corporation, New York, New York and is the subject matter of U.S. Pat. No. 3,404,061.

In addition to Leclanche electrochemical systems, a wide variety of electrochemical systems can be used in this invention. Among the positive electrode materials that are suitable for use in this invention are such materials as lead dioxide, nickel oxyhydroxide, mercuric oxide, silver oxide, inorganic metal halides such as silver chloride and lead chloride, and organic materials which are capable of being reduced such as dinitrobenzene and azodicarbonamide compounds. Among the negative electrode materials that are suitable for use in this invention are zinc-clad steel, aluminum, magnesium, lead, cadmium and iron. Suitable electrolytes are ammonium chloride and/or zinc chloride, various alkaline electrolytes such as the hydroxides of potassium, sodium and/or lithium, acidic electrolytes such as sulfuric or phosphoric acid, and non-aqueous electrolytes, said electrolytes being chosen to be compatible with the negative and positive electrodes. The electrolytes may be either gelled or liquid depending on the particular cell construction and the electrochemical system used. The separator may be made from a wide variety of materials including the fibrous and cellulosic materials which are conventional in battery construction as well as from woven or non-woven fibrous materials such as polyester, nylon, polyethylene and glass. In some cell systems, the non-conductive plastic network can be employed as the separator in addition to being the securing means as described above.

Preferred electrochemical systems for use in this invention are those in which the positive electrode comprises manganese dioxide, the negative electrode comprises metals such as zinc, zinc-clad steel or aluminum, and the electrolyte substantially comprises an acidic solution of inorganic salts. Another preferred electrochemical system is the alkaline manganese dioxide system in which the positive electrode comprises manganese dioxide, the negative electrode comprises zinc, and the electrolyte substantially comprises a solution of potassium hydroxide. Other aqueous electrolyte systems suitable for use with this invention are nickel oxide-zinc, silver oxide-zinc, mercury oxide-zinc, mercury oxide-cadmium and nickel oxide-cadmium.

The component assembly for use in liquid active reducible cathode cells according to this invention comprises a metal anode, a cathode collector and at least one plastic non-conductive network disposed between and adhesively secured at one of its faces to said metal anode and at its opposite face to said cathode collector thereby maintaining said metal anode and said cathode collector in a secured spaced-apart relationship. The liquid active reducible cathode material of this type cell can be employed by itself, mixed with a conductive solute which is a non-reactive material but is added to improve conductivity of the liquid active reducible cathode material, or mixed with both a conductive solute and an electrochemically active or non-reactive cosolvent material. When an electrolyte solvent performs the dual function of acting as solvent for an electrolyte salt and as the active cathode material of the cell, then it is referred to as a "cathode-electrolyte". In a fully assembled cell of this type, a cathode-electrolyte would be disposed between the metal anode and the cathode collector so as to be in contact with said anode and cathode collector through the openings in the plastic network. Since the cathode-electrolyte in one embodiment of this invention is a liquid, then an outer peripheral frame or border of moisture-impervious sealing material should be employed to contain said cathode-electrolyte within the cell between the anode and cathode collector. The peripheral frame of sealing material could be applied as disclosed in U.S. Pat. No. 3,563,805 to Deierhoi, Jr. Three sides of the peripheral frame could be applied after which the cathode-electrolyte could be introduced between the anode and cathode collector followed by the sealing of the fourth side of the frame, said frame being marginally adhered to said anode and said cathode collector and coextensive with the outermost edges thereof. Another approach would be to leave an opening in the frame to accommodate the introduction of the cathode-electrolyte whereupon the opening could then be sealed. The material used to form the frame must be adhesive, must not react with the cell components or reaction products, should be electrolyte-resistant and liquid impermeable, and should retain these properties over the temperature range of cell operation. Vinyl adhesives have been used in batteries for years and are suitable for use in forming the frame. Hot melt adhesives of vinyl-wax mixtures are also suitable.

In addition to the above, there are many other methods for containing a cathode-electrolyte between an anode and cathode collector of a cell.

Suitable nonaqueous cathode-electrolytes are sulfuryl chloride, thionyl chloride, phosphorus oxychloride, thionyl bromide, chromyl chloride, vanadyl tribromide, selenium oxychloride, and liquid sulfur dioxide. Suitable aqueous cathode-electrolytes include aqueous solutions of persulfate, peroxide, permanganate and chromic acid. Examples of suitable anodes for use in nonaqueous cells would include lithium, sodium, calcium, magnesium, lithium monoaluminide and lithium-magnesium while anodes for aqueous cells would include aluminum, zinc and cadmium. Suitable cathode collectors would be carbon, graphite or porous nickel. When using lithium anodes, the procedure to follow would be to initially secure a metal screen support, e.g., of nickel, to the non-conductive plastic network as disclosed above and thereafter press the active lithium anode material onto and into the exposed face of the metal screen support.

Some preferred combinations of nonaqueous liquid cathode-electrolytes and anodes would be as follows:
1. sulfuryl chloride/Li or Na;
2. thionyl chloride/Li or Na;
3. phosphorus oxychloride/Li or Na.

Some preferred combinations of aqueous liquid cathode-electrolytes and anodes would be a zinc, magnesium or aluminum anode in an aqueous solution of persulfate or chromic acid.

The component assembly for use in fuel cell systems according to this invention comprises an anode collector, a cathode collector and at least one plastic nonconductive network disposed between and adhesively secured at one of its faces to said anode collector and at its opposite face to the cathode collector. In an assembled cell, a separator is disposed between and in contact with said anode collector and said cathode collector through the openings in the plastic network, a fluid anode-containing electrolyte is disposed such that it is in contact with the outer face of said anode collector and a fluid active cathode is disposed such that it is in contact with the outer face of said cathode collector.

In fuel cell systems, the anode collector could be selected from the group consisting of carbon, nickel, stainless steel and the like; the cathode collector could be selected from the group consisting of carbon, nickel, stainless steel and the like; the active cathode could be selected from the group consisting of oxygen, $H_2O_2$, air and the like; and the active anode could be selected from the group consisting of hydrogen, hydrazine, alcohol, formaldehyde and the like.

Preferable fuel cell systems would be as follows:
1. hydrogen/KOH/oxygen or air;
2. hydrazine/KOH/oxygen, air or hydrogen peroxide;
3. alcohol/KOH/air or oxygen;
4. formaldehyde/KOH/air or oxygen.

The overall dimensions of the flat cells of this invention can vary widely depending on the particular system used, the specific power required, and the device or environment in which the cells are to be used. The plastic network, whether a single layer or a multi-layer construction, has to be thick enough so that it contacts and adhesively secures the two components of the cell in a spaced-apart relationship while leaving sufficient room to accommodate an additional cell component therebetween, if necessary, such as a separate separator, said additional component contacting the inner faces of the spaced-apart components through the openings in the plastic network.

The invention also relates to methods for producing a component assembly for use in electrochemical cells.

One such method for producing a component assembly for use in electrochemical cells comprises the steps:

a. preparing a sandwich assembly of a first cell component such as an anode, a second cell component such as a cathode and disposed therebetween at least one non-conductive plastic network;

b. applying pressure to said sandwich assembly so as to physically contact said first cell component to one face of the network and said second cell component to the opposite face of the network and heating said sandwich assembly under said pressure to a range between the softening point of said plastic network and the melting temperature of said network for a time period sufficient for the network to become substantially tacky; and c. cooling said sandwich assembly thereby yielding a permanent bond between the first cell component to one face of the plastic network and between the second cell component to the opposite face of the plastic network.

It is to be understood that the temperature employed shall not exceed the temperature that will adversely affect the electrochemical activity of the cathode material or adversely affect the other components of the cell.

The pressure used in step (b) should preferably be sufficient to partially embed the plastic network into the surfaces of the first and second cell components, if porous, and/or partially flatten said plastic network between the first and second cell components thereby insuring good contact therebetween. Sample temperatures for specific plastic materials are as follows:
1. polymethacrylate/temperature 80°–100°C.;
2. polyethylene/temperature 120°–150°C.;
3. polyvinyl chloride/temperature 60°–80°C.

Another method for producing a component assembly for use in electrochemical cells comprises the steps:

a. preparing a sandwich assembly comprising a first cell component such as an anode, a second cell component such as a cathode and disposed therebetween at least one solvent wetted, non-conductive plastic network, said solvent being one which is capable of at least partially dissolving the plastic material of the network;

b. applying a sufficient pressure to said sandwich assembly to effectively contact one face of said plastic network to said first component, and the opposite face of said plastic network to said second component; and c. vaporizing the solvent and releasing the pressure thereby producing a strong permanent bond between the first component and one face of the plastic network and between the second component and the opposite face of the plastic network.

Figure 1:
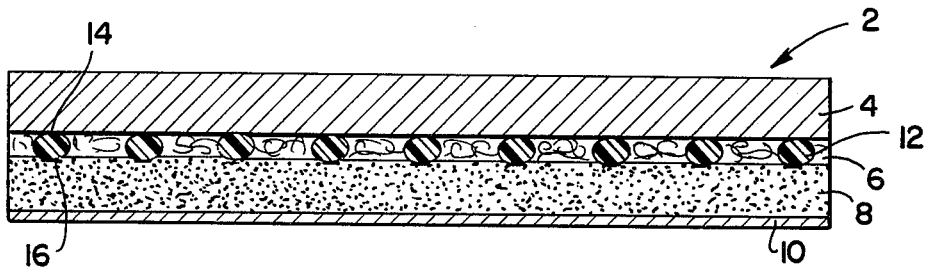
FIG. 1 is a partial cross-section of a cell wherein the components of the cell are shown greatly magnified for purposes of illustrating a plastic screen disposed between and securing in a spaced-apart parallel relationship the anode and cathode material of the cell.

Referring in more detail to the drawings, there is shown in FIG. 1 a thin flat cell 2, typical of a Leclanche type flat cell, having an expanded zinc anode 4, electrolyte-impregnated separator 6, cathode 8 and cathode collector 10. Disposed between anode 4 and cathode 8 is a plasticizable screen 12 which secures the anode 4 to one of its faces 14 and the cathode 8 to the opposite face 16. The electrolyte-impregnated separator 6 is positioned between anode 4 and cathode 8 and contacts the inner face of said anode 4 and the inner face of said cathode 8 through the openings in the plasticizable screen 12. Note that faces 14 and 16 of plasticizable screen 12 are flattened slightly between anode 4 and cathode 8.

Figure 2:
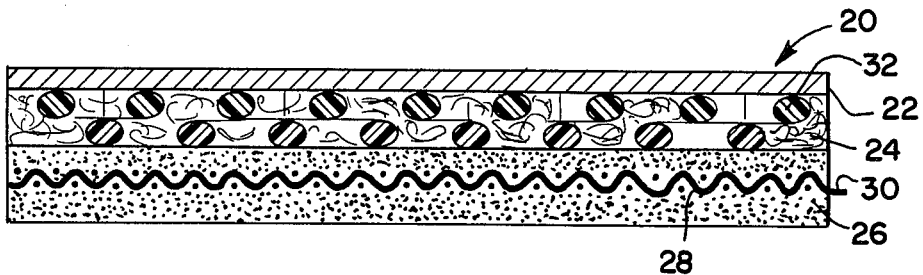
FIG. 2 illustrates an enlarged partial cross-section of a cell wherein two plastic screens are employed to secure the anode and cathode material in a fixed spaced-apart rleationship.

FIG. 2 shows another type of flat cell 20 having an anode 22, an electrolyte-impregnated separator 24 and cathode 26. A cathode collector screen 28 is shown disposed in cathode 26 and extending beyond the edge of the flat cell so as to form a tab 30 for providing external electrical contact to the cathode 26. Disposed between anode 22 and cathode 26 is a two-layer plasticizable screen 32 which secures the anode 22 to cathode 26 in a parallel spaced-apart relationship while allowing electrolyte-impregnated separator 24 to contact said anode 22 and cathode 26 through the openings in the two layer plasticizable screen 32. Note that the screens are shown superimposed one on the other with the top screen rotated 45° out of alignment with the bottom screen.

Figure 3:
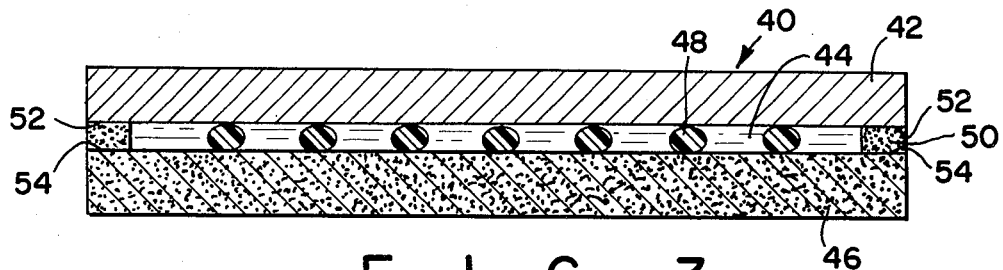
FIG. 3 illustrates an enlarged partial cross-section of a liquid cathode material cell employing a plastic screen for securing the anode to the cathode collector of the cell.

A liquid active cathode flat cell 40 is shown in FIG. 3 as having an anode 42, cathode-electrolyte 44 and cathode collector 46. A plasticizable screen 48 is shown disposed between and adhesively securing together the anode 42 and cathode collector 46 in a fixed spaced-apart parallel relationship. The cathode-electrolyte 44 is contained within and bound between anode 42 and cathode collector 46 by a frame or border of sealing material 50 which marginally bounds cathode-electrolyte 44 and is secured to the inner marginal face 52 of anode 42 and the inner marginal face 54 of cathode collector 46. As stated above, the adhesive used to form the frame 50 must not react with the cell components or reaction products, should be electrolyte-resistant and impermeable to liquid and vapor transfer and should retain these properties and its adhesivity over the temperature range of cell operation. Preferably, a suitable liquid-impervious conductive paint could be applied to the outer faces of the anode and cathode collector surfaces.

Figure 4:
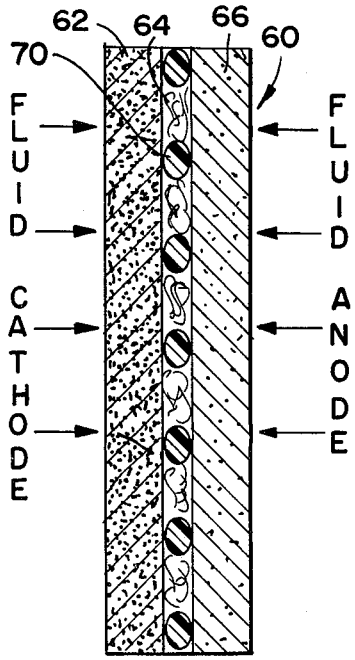
FIG. 4 illustrates an enlarged partial cross-section of a fuel cell showing a plastic screen securing the anode collector to the cathode collector of the cell.

A flat fuel cell 60 is shown in FIG. 4 having a gas-permeable cathode collector 62 and a fluid-permeable anode collector 66 with a separator 64 positioned therebetween. A plasticizable screen 70 is shown disposed between and adhesively securing together cathode collector 62 and anode collector 66. In the operational mode, a fluid anode such as $N_2H_4$ in a KOH solution or a gas such as hydrogen would be fed through anode collector 66, for example, of porous nickel, while a gas cathode, such as oxygen, would be fed through cathode collector 62, for example, of porous carbon. When a liquid anode material, such as $N_2H_4$, is used, separator 64 may suitably be composed of asbestos. The asbestos layer serves as a barrier between cathode collector 62 and anode collector 66 so as to minimize direct contact of the liquid anode with the cathode collector which would result in a chemical short circuit.

EXAMPLE 1

A Leclanche flat cell was produced similar to the one shown in FIG. 2. A polysulfone non-conductive screen, about 2 inches by 2 inches and 0.035 inch thick, was placed between a thin $MnO_2$ cathode having a similar area as the screen and being about 0.050 inch thick, and a fibrous separator which was soaked with dichloromethane, said separator having a similar area as the screen and being about 0.020 inch thick. The sandwich assembly was pressed between the plates of a hydraulic press using a force of about 500 lbs/in$^2$ for 10 seconds which was sufficient to press the solvent-wet, tacky polysulfone screen into the porous $MnO_2$ cathode and into the fibrous separator. The pressure was thereafter released and upon vaporization of the solvent, dichloromethane, a strong permanent bond was obtained between the polysulfone screen and the cathode.

On top of the separator side of the assembled sandwich, a second polysulfone screen was placed substantially superimposed on the first screen. The second plastic screen was wet with dichloromethane and then a zinc screen was superimposed on top of it. The assembly was thereafter pressed between the plates of a hydraulic press using a force of about 500 lbs/in$^2$ for about 10 seconds which was sufficient to press the solvent-wet, tacky polysolfone screen against the zinc screen and the first polysulfone screen. The pressure was released and upon vaporization of the solvent, a complete, strongly bonded cathode-separator-anode assembly was obtained.

The cell was activated by adding the electrolyte KOH through the zinc screen to soak the separator. The fully assembled cell was then abuse-tested by being discharged across a resistive load of 0.5 ohm and then allowed to stand for 48 hours in the completely discharged state after which no noticeable bulge was observed in the cell assembly, said bulge being generally indicative of separation between the anode and cathode of the cell.

EXAMPLE 2

A similar type flat cell as in Example 1 was produced except that only one polysulfone screen was used on the anodic side of the separator as shown in FIG. 1. As in Example 1, the fibrous separator was soaked with dichloromethane before the polysulfone screen was placed between the separator and the zinc screen anode. On the opposite side of the soaked fibrous separator was positioned a porous $MnO_2$ cathode. The assembly was pressed between the plates of a hydraulic press using a force of about 500 lbs/in$^2$ for 20 seconds which was sufficient to partially embed one face of the solvent-wet, tacky polysulfone screen through the separator and into the porous $MnO_2$ cathode and the opposite face of the screen into the zinc screen. The pressure was thereafter removed and upon vaporization of the solvent, dichloromethane, a strong permanently bonded zinc screen-fibrous separator-$MnO_2$ cathode assembly was obtained.

The cell was activated by adding the electrolyte KOH through the zinc screen to soak the separator. The fully assembled cell was then tested as in Example 1 and again no noticeable bulge was observed in the cell.

EXAMPLE 3

A hydrazine flat cell was produced by assembling, in superimposing order, a porous carbon cathode collector, a polysulfone screen, an asbestos separator soaked with dichloromethane, and a porous nickel anode collector. The assembly was pressed between the plates of a hydraulic press using a force of 500 lbs/in$^2$ for 5 seconds which was sufficient to embed one face of the solvent-wet, tacky polysulfone screen through the separator and into the porous carbon and the opposite face of the screen into the porous nickel collector. The pressure was thereafter released and upon vaporization of the solvent, dichloromethane, a strong permanent bonded porous nickel-asbestos separator-porous carbon assembly was obtained.

The cell was activated by contacting the porous nickel collector with an electrolyte-fuel mixture of KOH and $N_2H_4$, and the porous carbon collector with air. The fully assembled hydrazine cell was tested by being discharged continuously at 50 mA/cm$^2$. No noticeable bulge was observed in the assembly after 500 hours of operation.

EXAMPLE 4

A flat cell was produced by assembling, in superimposing order, a $MnO_2$ plastic bonded cathode, a polyethylene screen and a zinc screen anode. The assembly was pressed between heated platens at 100° C. for 20 seconds under a pressure of 500 lbs/in$^2$. After cooling to ambient, an electrolyte composed of a 30% aqueous zinc chloride solution containing starch as a gelling agent was disposed between the cell components by being absorbed through the zinc screen whereupon it gelled in place. The cell was then subjected to a mechanical test whereupon a force was applied to pull the cell components apart. The results of the test demonstrated that the components of the cell were securely bonded together and, therefore, would be admirably suited in a flat cell power source for various applications.

EXAMPLE 5

A metal/air cell was produced by assembling, in superimposing order, a thin porous carbon electrode which was coated with a 20% polytetrafluoroethylene aqueous solution, a polytetrafluoroethylene screen and a pressed amalgamated zinc porous anode. The assembly was pressed between heated platens at 300° C. for 20 seconds at 500 lbs/in$^2$. After cooling to ambient, a 6 N KOH liquid electrolyte was introduced into the cell through the porous zinc anode.

The cell was then discharged for a period of time to allow a small amount of ZnO to form which in a conventional unbounded metal/air cell construction would be generally sufficient to cause visible bulging and consequent separation of the components of the cell. However, no bulging or component separation was observed in the test cell. Furthermore, the cell was allowed to remain on open circuit in an air atmosphere and again no bulging was observed.

In accordance with this invention, the solvent can be applied to the plastic network using any suitable technique such as soaking, spraying or as described in the Examples. The amount of solvent to be applied should be sufficient to make the surface of the plastic network tacky but not enough to dissolve it. This latter requirement is necessary to insure that the plastic network does not form a film between the anode and cathode components of the cell since the plastic network has to be a discontinuous layer in the final cell assembly so as not to isolate the cathode from ionic contact with the anode. The pressure applied to the assembly, as shown in the above Examples, need only be applied for a few seconds or for a period sufficient to impart good contact between one face of the plastic network and the anode and the opposite face of the plastic network and the cathode.

It is evident from the above Examples that by placing a plastic network, which can be temporarily plasticized by exposure to a solvent and/or heat, between an anode and a cathode and then pressing the assembly together, a permanent bond between the anode and collector can be obtained. This is of primary importance in a flat cell where a large area anode and a large area cathode are spaced apart only by a semi-wet separator since any gas evolved during cell storage or during discharge can easily bulge the cell, if not properly vented, which could result in the introduction of a high internal resistance in the cell. This occurrence is especially serious in high current output alkaline cells employing systems such as $MnO_2$—Zn, Ni—Cd or hydrazine-air.

It is to be understood that other modifications and changes to the embodiments of the invention herein shown and described can also be made without departing from the spirit and scope of the invention.

What is claimed is:

1. A component assembly for use in electrochemical cells comprising a first component, a second component and at least one plastic non-conductive network having openings disposed substantially coextensively between and adhesively secured to said first component at one of its faces and to said second component at its opposite face thereby maintaining said first component and said second component in a secured, spaced-apart relationship said openings having active or inactive material in contact with the faces of the two components.

2. The component assembly of claim 1 wherein said first component is a metal anode and said second component is a molded cathode of oxidic material.

3. The component assembly of claim 2 wherein an electrolyte is disposed between and in contact with the inner face of the anode and the inner face of the cathode material through the openings in the plastic network.

4. The component assembly of claim 2 wherein said plastic network is selected from the group consisting of polyethylene, polysulfone, acrylic, polymethacrylic resin, nylon, polyvinyl chloride, polypropylene, polystyrene and polytetrafluoroethylene.

5. The component assembly of claim 4 wherein the metal anode is selected from the group consisting of zinc, zinc-clad steel, aluminum, lead, cadmium, magnesium and iron; and wherein said cathode material is selected from the group consisting of manganese dioxide, lead dioxide, nickel oxyhydroxide, mercuric oxide, silver oxide and inorganic metal halides.

6. The component assembly of claim 5 wherein said anode is zinc; said cathode material is manganese dioxide; and an electrolyte of an aqueous solution of KOH is disposed between and in contact with the inner face of the manganese dioxide and the inner face of the zinc through the openings in the plastic network.

7. The component assembly of claim 1 wherein said first component is a metal anode and said second component is a cathode collector.

8. The component assembly of claim 7 wherein a cathode-electrolyte is disposed so as to be in contact with the inner face of said metal anode and the inner face of said cathode collector through the openings in the plastic network.

9. The component assembly of claim 7 wherein said plastic network is selected from the group consisting of polyethylene, polysulfone, acrylic, polymethacrylic resin, nylon, polyvinyl chloride, polypropylene, polystyrene and polytetrafluoroethylene.

10. The component assembly of claim 9 wherein said anode is selected from the group consisting of zinc, manganese, aluminum, lithium, sodium, calcium, lithium monoaluminide and lithium-magnesium; and wherein said cathode collector is selected from the group consisting of carbon, graphite and porous nickel.

11. The component assembly of claim 1 for use in fuel cells wherein said first component is an anode collector and said second component is a cathode collector.

12. The component assembly of claim 11 wherein a separator is disposed between and in contact with the inner face of the anode collector and the inner face of the cathode collector through the openings in the plastic network.

13. The component assembly of claim 11 wherein said plastic network is selected from the group consisting of polyethylene, polysulfone, acrylic, polymethacrylic resin, nylon, polyvinyl chloride, polypropylene, polystyrene and polytetrafluoroethylene.

14. The component assembly of claim 13 wherein the anode collector is selected from the group consisting of carbon, nickel, and stainless steel; and wherein the cathode collector is selected from the group consisting of carbon, nickel and stainless steel.

15. The component assembly of claim 1 for use in metal/gas cells wherein said first component is a metal anode and said second component is a cathode collector.

16. The component assembly of claim 15 wherein a separator is disposed between and in contact with the inner face of the metal anode and the inner face of the cathode collector through the openings in the plastic network.

17. The component assembly of claim 15 wherein said plastic network is selected from the group consisting of polyethylene, polysulfone, acrylic, polymethacrylic resin, nylon, polyvinyl chloride, polypropylene, polystyrene, and polytetrafluoroethylene.

18. The component assembly of claim 17 wherein the metal anode is selected from the group consisting of zinc, aluminum, and magnesium; and wherein the cathode collector is selected from the group consisting of carbon, nickel, and stainless steel.

* * * * *